UNITED STATES PATENT OFFICE.

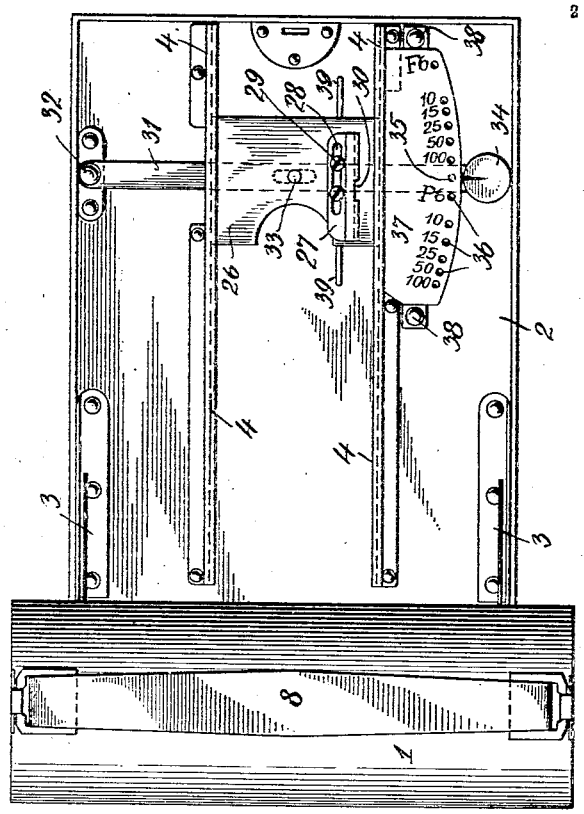
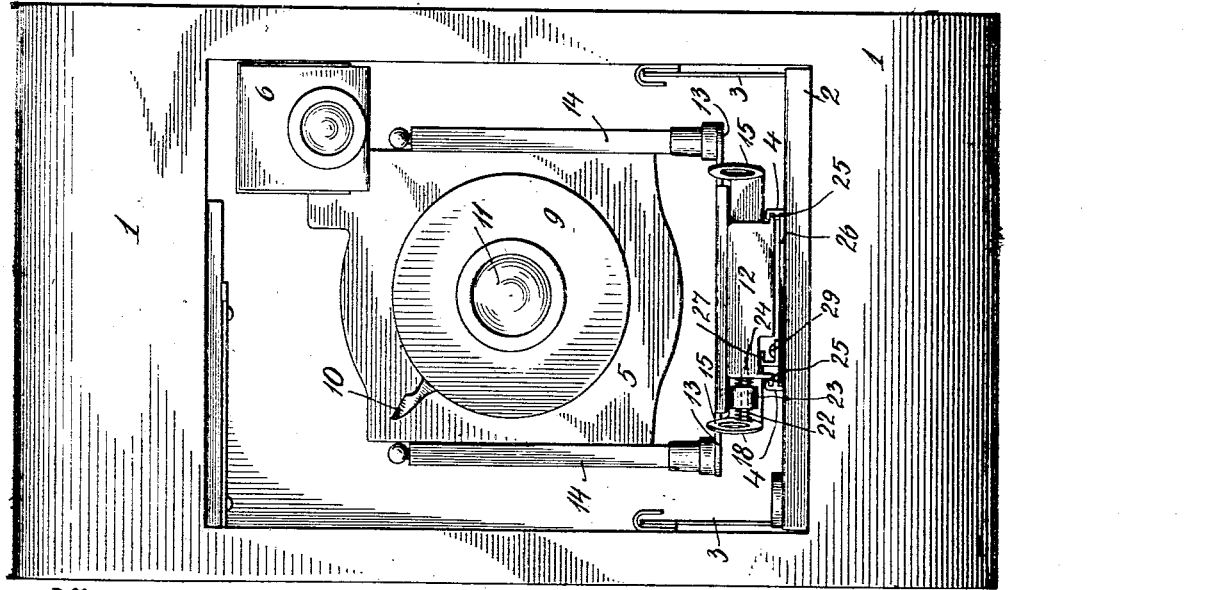

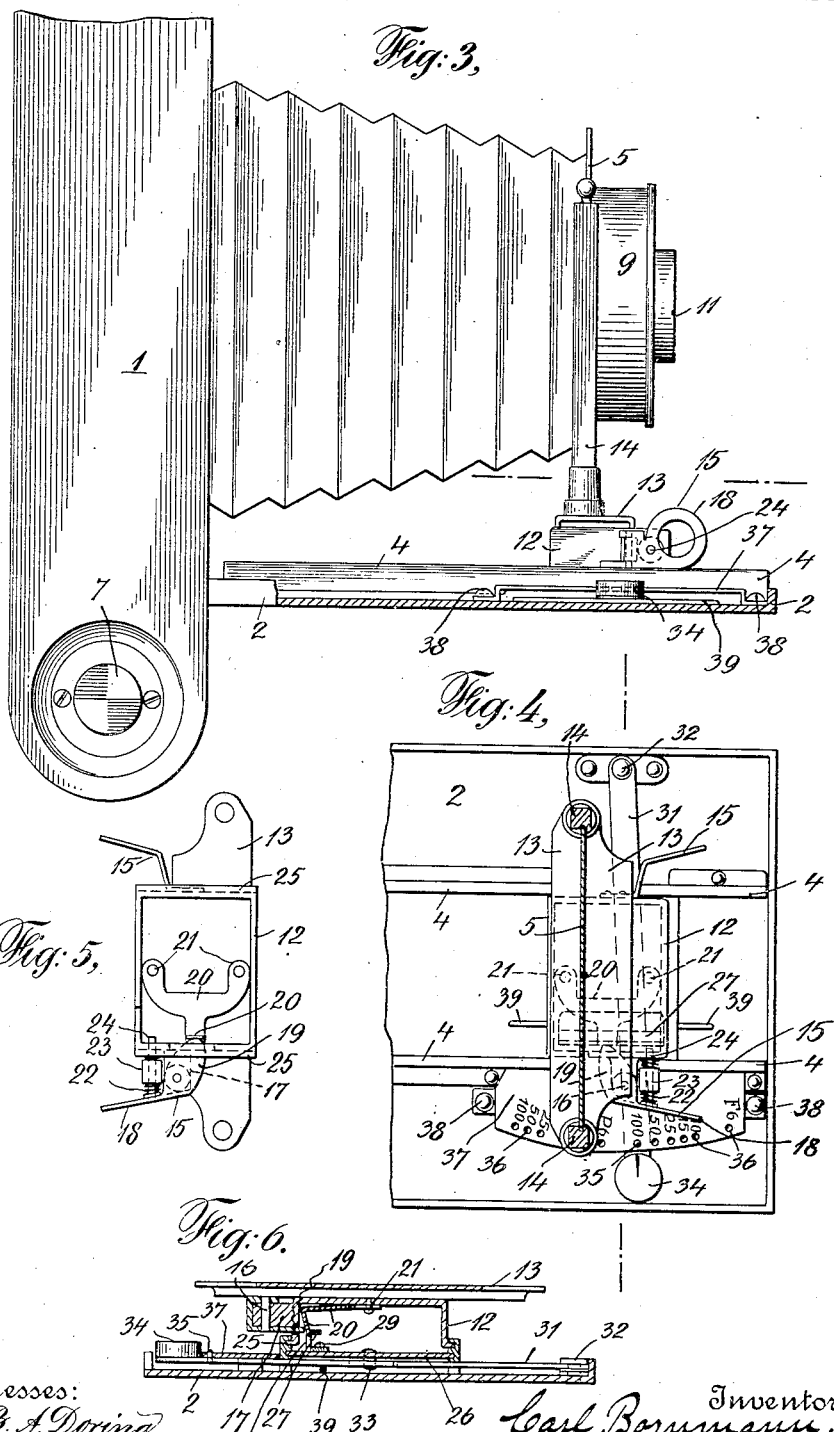

CARL BORNMANN, OF BINGHAMTON, NEW YORK, ASSIGNOR TO ANSCO COMPANY, OF BINGHAMTON, NEW YORK.

PHOTOGRAPHIC CAMERA.

1,029,270.        Specification of Letters Patent.       Patented June 11, 1912.

Application filed January 12, 1912. Serial No. 670,913.

*To all whom it may concern:*

Be it known that I, CARL BORNMANN, a citizen of the United States, and a resident of the city of Binghamton, county of Broome, and State of New York, have invented certain new and useful Improvements in Photographic Cameras, of which the following is a full, clear, and exact description.

It is the purpose of this invention to improve the so-called lock focusing devices in folding cameras by so forming and arranging the parts that they shall be simple and durable in construction and automatic in operation, so that the locking and unlocking of the movable lens supporting frame with the co-acting lock focus devices will be performed without any conscious act on the part of the operator.

In the drawings, Figure 1 illustrates a front elevation of a camera embodying the invention, the folding front board being lowered; Fig. 2 illustrates a plan view of that which is shown in Fig. 1, certain parts shown therein being omitted; Fig. 3 illustrates a side elevation of that which is shown in Fig. 1, partly in section and some of the unimportant parts left off; Fig. 4 illustrates a plan view, enlarged and partly in section, of the parts immediately involved in the invention; Fig. 5 illustrates a detail of the under side of the casing which contains certain of the locking devices; Fig. 6 illustrates a sectional view of the locking devices and certain of the co-acting parts.

In the drawings, 1 represents the camera proper, 2 the folding front board, 3 the braces therefor, 4 the slide rails on the front board for the lens supporting frame, 5 the lens supporting frame, 6 the finder, 7 one of the pin journals for one of the spools, 8 the camera handle, 9 the shutter casing, 10 the shutter lever, and 11 the lens. All of the above parts may be of any preferred construction.

12 is a box or casing which is connected in any suitable manner, preferably by devices which will afford lateral adjustment, (not shown) to a base plate or bar 13 which is the support for the uprights 14, 14, in which the shutter and lens supporting plate 5 slides. Connected to the sides of the box 12 are two finger clips 15, 15. They are preferably ring-like in form, as shown best in Figs. 1 and 3. The one at the right of the box is merely a rigid piece of metal of appropriate shape, riveted or otherwise fastened to the side of the box 12, but the one at the left has the general form of a bellcrank lever, shown best in Fig. 5. It is pivoted as at 16 to a stud 17 on the side of the box 12, and its outer arm 18 (see Fig. 5) constitutes the thumb piece of the device, while its inner arm 19 rests against the bent end of a spring pawl 20 which is fastened at its ends, as at 21, 21, to the inside of the box 12, and thus has considerable resiliency. The bellcrank lever has also a spring 22 which is largely inclosed in a confining sleeve 23. It is also provided with a guiding stem 24. which parts coacting together, normally press the thumb piece end of the bell-crank lever outwardly, and consequently maintain pressure of its inner end upon the extreme bent end of the spring pawl 20, whereby it is normally pressed inwardly toward the center of the box, as shown in Fig. 6.

The lateral edges of the box 12 are provided with means, such as the narrow flanges 25, 25, whereby it may properly engage with, slide upon and be guided by the slideway bars 4, on the front board.

The parts last above described constitute the parts of the locking mechanism that are connected to and move with the lens mechanism. The parts with which they co-act are as follows: 26 is a metallic plate the lateral edges of which engage in and are adapted to smoothly slide along grooves made in the sides of the slideway rails 4 on the front board as shown best in Figs. 1, 2 and 6. 27 is a two angled block adjustably connected to the plate 26 by a slot 28 and screws 29 (see Fig. 2) made through one of its angles or webs. The other web stands upright and in its side is made a recess 30 adapted to receive the movable end of the spring pawl 20, when they are in registration with each other. The block 27 is made adjustable in order to compensate for slight variances in the focal length of lenses. 31 is a lever made of resilient material. It is pivoted at 32 to the front board and extends across the same underneath the sliding plate 26 and is pivotally connected to it as by pivot 33, and at its free end it is provided with a thumb disk 34, or its equivalent. 35 is a pin set in the lever 31 adapted to enter a series of holes 36 made in a curved index plate 37, (see Figs. 3 and 4) beneath which the resilient end of the lever 31 is located and whereby it is controlled. The index plate is fastened to the front board by screws 38 and has stamped upon its exposed surface dual indices, one of them marked F is adapted to films and other marked P to plates or packs. The figures on these indices determine the focal distances in feet, as usual, and the holes 36 for the reception of the pin 35 of the lever 31 are placed opposite the said numbers, also in the usual manner. In order that the lever 31 may have the requisite resiliency to cause its pin 35 to pass into and securely remain engaged with the holes 36 in the index plate, I provide what may be called a fulcrum strip 39 which is raised above the surface of the front board, or the covering therefor, if there be any. Thus not only is the desired spring action secured, but also all injury to the finish of the front board, or its covering, because of the scraping of the lever over it, which might otherwise occur, is avoided.

The operation is obvious. Assume that the camera is closed. To prepare it for an exposure, the front board is lowered. The operator then with finger and thumb of one hand, catches hold of the two ring-like clips 15, 15, and using them as a handle draws the lens supporting devices forwardly, extending the bellows, all in the usual manner. His grasp of the clips will exert such pressure on them that unconsciously the one at the left will be operated in such manner as that the spring pawl 20 will be released from pressure and assume its retracted position, that is to say, the pressure of the operator's thumb on the outer member 18 of the bellcrank lever will compress the spring 22 and thus cause the inner arm of the bellcrank lever to be removed from the end of the pawl 20 which, because of its own resiliency, will then straighten out, so that it will not in its then position engage in the recess 30 in the block 27 of the sliding plate 26. When, however, the lens supporting devices have been so far projected that the box 12 is in proper relation to the sliding plate 26, then suitable stops, not shown, but which may be any suitable surfaces on these two parts, coming in contact with each other, will give notice to the operator that the parts are in position for interlocking, and thereupon as the grasp of the operator upon the finger clips is released, the spring 22 in the left hand or bellcrank clip will again exert its pressure upon the co-acting parts, so that the end of the spring pawl 20 will be again pressed inwardly toward the center of the box 12 and being now in registration therewith will enter the recess in the block 27 on the sliding plate 26, thus securely locking the box 12 and consequently the entire lens supporting mechanism carried by it to the plate 26. The requisite focal position of the parts for any desired exposure may now be accurately and quickly attained by simply pressing gently on the finger disk 34 on the end of the lever 31, whereby the free end of that lever will be depressed and the pin 35 carried by it withdrawn from that one of the holes 36 in the index plate 37, as it then happens to occupy. Thereupon the desired focal distance may be attained by simply swinging the end of the lever in one direction or the other as desired, permitting the pin 35 to enter such other hole in the index plate as the numerals thereon shall determine. To return the parts to primary position, the operator again grasps the clips 15 with the thumb and finger and again unconsciously exerts such pressure upon them as will release the end of the spring pawl from engagement in the recess of the block 27, whereby the interlocking of the parts is released or broken and the lens supporting devices may then be pressed back into the camera box proper and the front board closed.

It will be obvious to those who are familiar with such matters that alterations may be made in the details of construction of the parts and to some extent in their arrangement and yet the essentials of the invention be employed. I therefore do not limit myself to the details illustrated and described. They represent one form only in which the invention may be embodied.

I claim:

1. In a focusing device for cameras, a movable lens supporting frame, finger clips on said frame, a slideway for the lens supporting frame, a longitudinally movable part guided by the slideway, and interlocking devices on the said part and on the lens supporting frame operated by manipulation of the finger clips.

2. In a focusing device for cameras, a movable lens supporting frame, finger clips on said frame, a slideway for the lens supporting frame, a longitudinally movable part guided by the slideway, interlocking devices on said part and on the lens supporting frame operated by manipulation of the finger clips, a swinging lever pivoted at one end to the camera, an index plate with which the free end of the lever engages, and means connecting the lever with said longitudinally movable part.

3. In a focusing device for cameras, a movable lens supporting frame, a slideway therefor, a longitudinally movable part guided by the slideway, devices on said part and on the lens supporting frame adapted to interlock when in registration with each other, a swinging lever pivoted at one end to the camera, an index plate at the free end of the lever, means to lock the lever to the index plate, and means connecting the lever with said longitudinally movable part about midway its ends.

4. In a focusing device for cameras, a movable lens supporting frame, a spring pressed finger clip on said frame, a slideway for the lens supporting frame, a longitudinally movable part guided by the slideway, devices on said part and on the lens supporting frame controlled by the spring actuated finger clip and which interlock when in registration with each other, and a pivoted lever means connecting the lever with said movable part, whereby its position may be determined.

5. In a focusing device for cameras, a movable lens supporting frame, a spring pressed finger clip on said frame, a slideway for the lens supporting frame, a longitudinally movable part guided by the slideway, devices on said part and on the lens supporting frame operated by the spring actuated finger clip and which interlock when in registration with each other, a pivoted lever, means connecting the lever with said movable part, and an index plate, said lever being adapted to interlock with and be held by the index plate, whereby the position of the said movable part may be varied to correspond with different focal distances.

6. In a focusing device for cameras, a movable lens supporting frame, a resilient lever pivotally held at one end, means whereby the lever may be engaged with and disengaged from the lens supporting frame, an index frame with which the free end of the lever engages and by which it is held, and means upon the camera adapted to increase the resiliency of the lever, whereby its engagement with the index is assured.

7. In a focusing device for cameras, a movable lens supporting frame, a resilient lever pivotally held at one end, means whereby the lever may be engaged with and disengaged from the lens supporting frame, an index frame with which the free end of the lever engages and by which it is held, means upon the camera and projecting therefrom, whereby the lever is held away from the surface of the camera over which it swings, its flexure increased, and its engagement with the index thus assured.

8. In a focusing device for cameras, a movable lens supporting frame, a slideway therefor, a longitudinally movable part guided by the slideway, devices on said part and on the slideway adapted to interlock when they are in registration, a resilient lever pivotally held at one end, means connecting the lever with the movable part at about midway its ends, an index plate with which the free end of the lever engages and by which it is held, and means projecting from the surface of the camera, whereby the lever is separated therefrom and its flexure increased, so that its engagement with the index is better assured.

9. In a focusing device for cameras, a movable lens supporting frame, a resilient pawl carried thereby, a spring actuated finger clip engageable with said pawl, a slideway for the lens supporting frame, a longitudinally movable part guided by the slideway, and devices on said part adapted to engage with the pawl when they are in registration with each other.

10. In a focusing device for cameras, a movable lens supporting frame, a resilient pawl carried thereby, a spring actuated finger clip normally engaging with said pawl, a slideway for the lens supporting frame, a longitudinally movable part guided by the slideway, devices on said part adapted to engage with the pawl when they are in registration with each other, a pivoted lever connected to said movable part, and an index plate with which the free end of the lever engages and by which it is held.

11. In a focusing device for cameras, a movable lens supporting frame, a slideway therefor, an index plate bearing dual indices, one adapted for films, the other for plates, a lever pivoted at one end to the camera, and means whereby the lever is connected about midway its ends with the movable lens supporting frame, the construction and arrangement of the parts being such that the free end of the lever is adapted to swing into proper registration with both of said indices and to be locked thereto at predetermined places.

12. In a focusing device for cameras, a movable lens supporting frame, a slideway therefor, a plate guided by the slideway, devices upon the plate and upon the lens supporting frame adapted to interlock when in registration with each other, a pivoted lever connected to said movable plate, and an index plate at the free end of the lever with which it interlocks, whereby said plate may be held on the slideway at predetermined locations.

13. In a focusing device for cameras, a movable lens supporting frame, a slideway therefor, a movable plate guided by the slideway, an adjustable locking device on said plate, a spring actuated finger clip on the frame, a pawl carried by said frame and normally held in engagement with said locking device by the spring of the finger clip, but withdrawn therefrom by pressure upon the finger clip during manipulation thereof, a lever pivoted at one end to the camera, an index plate with which the free end of said lever interlocks, and means connecting said lever with the movable plate.

In testimony whereof I have signed my name to this specification in the presence of two subscribing witnesses.

CARL BORNMANN.

Witnesses:
 GEO. W. POPLIFF,
 A. DEICHELMANN.